US011263385B1

(12) United States Patent
Luk et al.

(10) Patent No.: US 11,263,385 B1
(45) Date of Patent: Mar. 1, 2022

(54) WEB BROWSER EXTENSION FOR LINKING IMAGES TO WEBPAGES

(71) Applicant: eBay Inc., San Jose, CA (US)

(72) Inventors: Ellis Shui-Man Luk, San Francisco, CA (US); Valeri J. Yee, San Jose, CA (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/211,220

(22) Filed: Mar. 24, 2021

(51) Int. Cl.
*G06F 40/134* (2020.01)
*G06K 9/00* (2006.01)
*G06F 16/957* (2019.01)
*G06F 16/955* (2019.01)
*G06F 16/954* (2019.01)
*G06F 3/0484* (2013.01)
*G06F 3/04842* (2022.01)

(52) U.S. Cl.
CPC ........ *G06F 40/134* (2020.01); *G06F 3/04842* (2013.01); *G06F 16/954* (2019.01); *G06F 16/9558* (2019.01); *G06F 16/9577* (2019.01); *G06K 9/00711* (2013.01)

(58) Field of Classification Search
CPC .............. G06F 40/134; G06F 16/9558; G06K 9/00711
See application file for complete search history.

(56) References Cited

U.S. PATENT DOCUMENTS

| 6,229,541 B1* | 5/2001 | Kamen .......... H04N 21/234318 715/719 |
| 6,642,940 B1* | 11/2003 | Dakss .................. G06F 16/748 715/723 |
| 7,120,924 B1* | 10/2006 | Katcher .................. H04N 1/64 725/60 |

(Continued)

FOREIGN PATENT DOCUMENTS

WO   WO-2020209835 A1 * 10/2020   ......... G06K 9/00671

OTHER PUBLICATIONS

JKON,"TensorFlow-image-recognition-chrome-extension", Chrome browser extension for using TensorFlow image recognition on web pages, Mar. 11, 2021, 4 pages.

(Continued)

*Primary Examiner* — Asher D Kells
(74) *Attorney, Agent, or Firm* — Shook, Hardy & Bacon, L.L.P.

(57) ABSTRACT

A web browser extension identifies graphic objects from images or video being presented by a web browser. Webpages related to the graphic objects are identified. Web links that facilitate navigation to the webpages are embedded over an area of the image corresponding to the identified graphic image. Where the graphic objects are identified within video, the web links are progressively embedded within graphic object boundaries of the graphic object as the graphic objects move locations during progression of the video. In this way, a user is able to interact with graphic objects of images and video to navigate to webpages related (Continued)

to the graphic objects. Some implementations provide a webpage redirect command at a stop point of the video so that the user can interact with graphic objects while the video is playing and without interrupting the video.

19 Claims, 8 Drawing Sheets

(56) References Cited

U.S. PATENT DOCUMENTS

| | | | | |
|---|---|---|---|---|
| 7,343,617 | B1* | 3/2008 | Katcher | H04N 21/234318 725/61 |
| 7,804,506 | B2* | 9/2010 | Bates | H04N 21/858 345/589 |
| 8,385,589 | B2 | 2/2013 | Erol et al. | |
| 9,177,225 | B1* | 11/2015 | Cordova-Diba | G06K 9/00671 |
| 10,674,230 | B2* | 6/2020 | Berry, III | H04N 21/47815 |
| 10,977,518 | B1* | 4/2021 | Sharma | G06N 5/048 |
| 2008/0066107 | A1* | 3/2008 | Moonka | G11B 27/28 725/42 |
| 2009/0144772 | A1* | 6/2009 | Fink | H04N 21/812 725/42 |
| 2011/0137753 | A1* | 6/2011 | Moehrle | G06F 16/71 705/27.1 |
| 2014/0019862 | A1* | 1/2014 | Fink | G06F 3/0482 715/719 |
| 2015/0339303 | A1* | 11/2015 | Perlegos | G06F 16/7867 707/756 |
| 2017/0046573 | A1* | 2/2017 | Varadarajan | G06F 16/783 |
| 2019/0253747 | A1* | 8/2019 | Ramaswamy | G06K 9/00744 |
| 2020/0134320 | A1* | 4/2020 | Crossley | G06Q 30/0643 |

OTHER PUBLICATIONS

GeeksfoGeeks "Displaying the coordinates of the points clicked on the image using Python-OpenCV", Retrieved from Internet URL: https://www.geeksforgeeks.org/displaying-the-coordinates-of-the-points-clicked-on-the-image-using-python-opencv/, Oct. 8, 2021, 7 Pages.

RSDharra,"Displaying Camera Frames", Retrieved from Internet URL: https://rsdharra.com/blog/lesson/7.html, Accessed on Oct. 28, 2021, 1 Page.

OPENCV,"Flags related creating and manipulating HighGUI windows and mouse events", Retrieved from Internet URL: https://docs.opencv.org/4.5.3/d0/d90/group_highgui_window_flags.html, Accessed on Oct. 28, 2021, 3 Pages.

OPENCV,"How to Detect Mouse Clicks and Moves", Retrieved from Internet URL: https://www.opencv-srf.com/2011/11/mouse-events.html, Accessed on Oct. 28, 2021, 5 Pages.

OPENCVEXAMPLES,"Detect Mouse Clicks and Moves on Image Window", Retrieved from Internet URL: http://opencvexamples.blogspot.com/2014/01/detect-mouse-clicks-and-moves-on-image.html, Accessed on Oct. 28, 2021, 7 Pages.

PYTHON,"Webbrowser—Convenient web-browser controller", Retrieved from Internet URL: https://docs.python.org/3/library/webbrowser.html. Accessed on Oct. 28, 2021, 3 Pages.

* cited by examiner

WEB BROWSER EXTENSION FOR LINKING IMAGES TO WEBPAGES

BACKGROUND

Hyperlinks generally give a web user a way to quickly navigate the web. By selecting a hyperlink, a user can navigate to a target page of the hyperlink without having to enter or know the web address of the target page. Hyperlinks can also be embedded at locations other than webpages, thus allowing users to navigate from other locations, such as a document, to the target page provided by a web browser.

Hyperlinks can also serve as a useful tool for providing additional contextually relevant information. For instance, a user reading an article about the solar system might be provided with a hyperlink to a target page that includes more detail about a particular planet. In the context of the article, this hyperlink could be embedded within the text corresponding to the planet's name. Thus, if a user wanted to find out more information about the planet, then the user could select the hyperlink and navigate to the target page within the web browser that includes this information.

SUMMARY

At a high level, aspects described herein relate to system, media, and methods for linking webpages. In particular, a user may selectively activate a browser extension that monitors information being provided by a web browser. When images or video are being provided, the images or video usually includes graphic objects. The web browser extension can perform image recognition on the images to identify the graphic objects and graphic object boundaries, such as the edge of the graphic object within the image.

Once identified, the web browser extension performs a reverse image search on the web using a reverse image search engine. The graphic object is searched based on the graphic object boundaries. The output of the reverse image search engine includes a webpage related to the graphic object.

A web link is then embedded within the graphic object, and the area in which the web link is embedded can be within and extend to the graphic object boundary. Thus, from the perspective of the user, the user can select the graphic object that is being displayed to take an action, such as initiating a webpage redirect command to navigate to the related webpage or initiate a sequence that causes the webpage redirect command to initiate or be presented at a stop point of a video.

In cases where the graphic object is identified from within a video, the graphic object may move locations on the screen as the video is played. In this case, the web link can be progressively embedded within the locations. By doing so, a user may select a graphic object on the screen while the video is playing to take an action, even where the graphic object is moving across the screen.

This summary is intended to introduce a selection of concepts in a simplified form that is further described in this disclosure. The summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
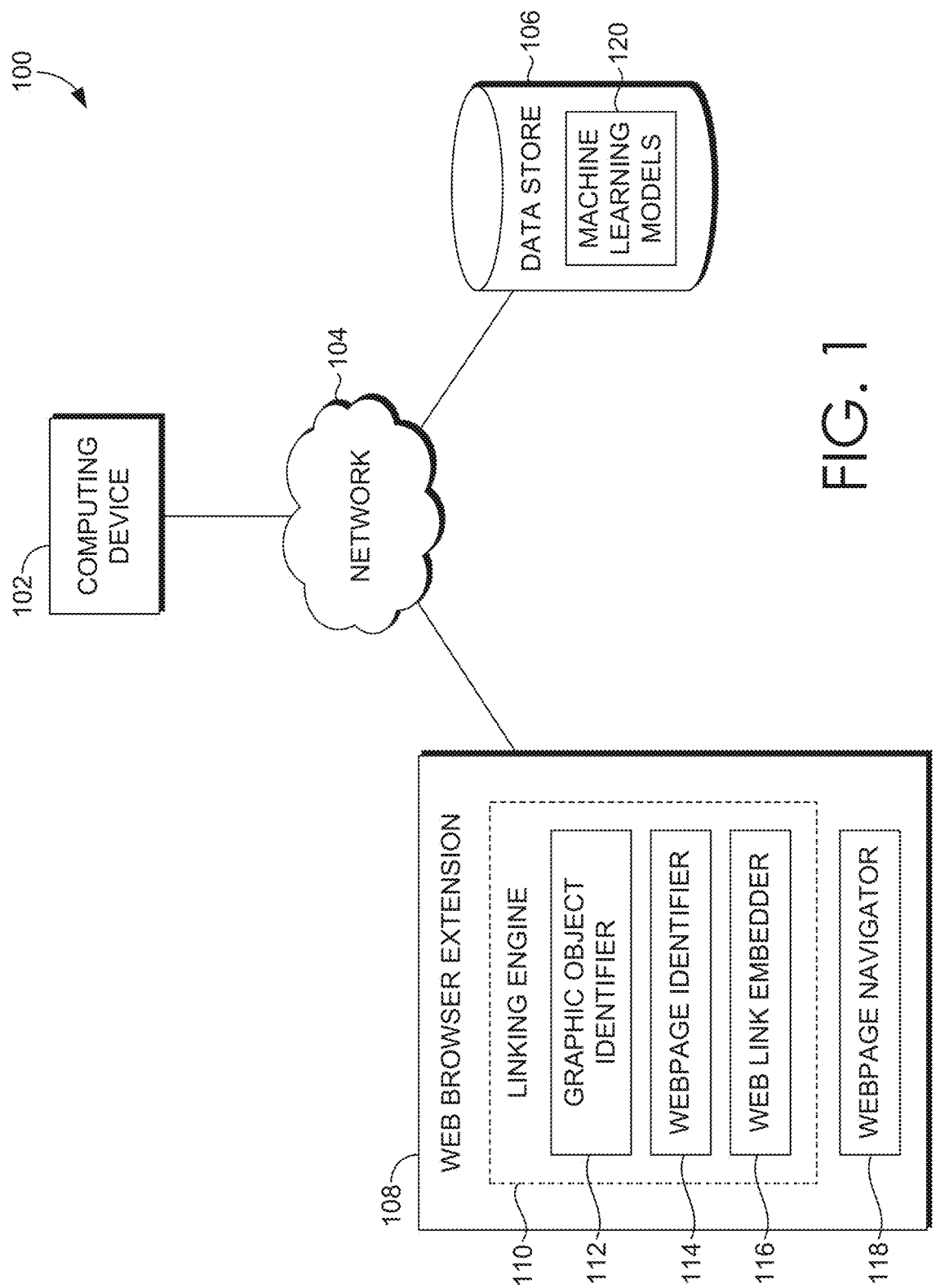
FIG. 1 is an example operating environment having an example web browser extension, in accordance with an aspect described herein.

Web links provide a mechanism by which a user can effectively navigate the Internet. Web links may act as hyperlinks that immediately navigate a user to another webpage, or may act to initiate some other action upon selection. Traditionally, web links are provided in documents or in text. In some cases, they are embedded across an entire image.

These web links, however, are intentionally placed by a webpage designer. They require that the webpage designer have some knowledge and understanding of the target pages where users may wish to navigate. To do so, a webpage designer will identify the target page and then actively embed a web link comprising a hyperlink that instructs a web browser to navigate to the target page. When identifying the target page, it is likely that the webpage designer would have to rely separately on a search engine to identify the web address of the target page for embedding. Ultimately, although the end user may experience a web link that is a more effective method for navigating the web, this option is only available to the user because someone else, namely the webpage designer, has already gone through the process of identifying the target page and embedding the web link.

While a web link can be embedded in an image, the webpage designer cannot embed the web link over particular regions of an image. Thus, the traditional web links, including hyperlinks, have no way to differentiate different objects that might be within an image. For example, if an image comprises a landscape of a forest and a fox, then a web link embedded might comprise a hyperlink targeting a webpage related to a particular type of tree in the forest. However, this is not helpful for someone wanting to navigate to a target page related to the fox.

This problem is further complicated when shifting from images to video, including live streamed video. Here, traditional web links generally do not provide context for what is being displayed during different portions of the video because the video continually changes from one scene to the next. Not only do the individual scenes change, but also each frame within a scene might include multiple video objects that might interest someone.

To get around this, historically, web links might be provided in a section separate from the video. Some popular video streaming websites provide a dropdown menu below a streaming video to give the user web links related to objects of the video. Thus, if a user wishes to find out more about something in the video, the user is required to sift through a list of links to try to find a web link for the information they are looking for, which may not even be present.

Even if it were possible to provide some sort of web link as part of a video, current technology would require that this process be an offline process, meaning that the web links would require pre-embedding. This is not suitable for all content, however, as it would not be possible to remove every video accessible through the Internet for an offline embedding process. Further, many videos are directly from sources not capable of embedding information. For instance, a digital camera may capture videos or images and then directly upload them to a web accessible platform. As such, if any embedding process did occur, the image or video would have to be removed and replaced in a separate process.

The technology provided by this disclosure alleviates many of these problems inherent in the traditional methods of embedding web links. In general, the processes that will be described provide for embedding web links in multiple areas of an image or a video. In particular, some aspects not only embed web links over a specific area of an image or video, but also embed web links over an area corresponding to a graphic object in an image. In this way, a person could interact with the web link by interacting with a graphic object that is provided in the image. Back to the landscape example just discussed, this would allow the user to interact with a web link related to the specific type of tree, while also being able to interact with a separate web link for the fox. Thus, in this example, the user could click on, or use another type of selection input, the tree in the image or the fox in the image to interact with the respective links.

Further, the technology allows web links to be embedded within a video as the video is being played. Thus, some aspects of the technology permit an online process for identifying related web pages and embedding web links. In this way, many videos, and even images, do not have to be removed or separately interacted with during an offline process. This permits other technology, like digital cameras to directly upload images or videos, and once uploaded, the web links can be embedded while the image is being viewed or while the video is playing.

One method that can be performed from the technology that will be described and that effects the previously described advantages over traditional technology uses a web browser extension to monitor images or video, and embed web links relevant to a graphic object or the user.

Here, the web browser extension can monitor images or video, including graphic objects that are within the images or video, being provided by the web browser. For instance, a user might be on the Internet streaming a movie. The web browser extension performs image recognition on images being displayed. For videos, this may include performing image recognition on frames or still shots from the video. The output of the image recognition includes an identity of graphic objects and their corresponding graphic object boundaries.

Having identified a graphic object with its graphic object boundaries, a webpage related to the graphic object can be identified. For instance, by removing the background outside of the graphic object boundaries, the graphic object can be the object of a reverse image search. This might be a general reverse image search to identify webpages across multiple websites or may be a focused reverse image search that identifies a webpage of a particular website. In doing this, the identified webpage is related to the graphic object.

A web link can now be embedded in the image provided at the web browser. The web link can be embedded within the graphic object boundary so that a user can interact with the web link within the graphic object boundary. The web link can be embedded over an area within and extending to the graphic object boundary. Thus, the user may provide a selection input anywhere within the graphic object boundary to interact with the web link. The web link facilitates navigation to the related web page by initiating a webpage redirect command, such as a hyperlink, to immediately cause the browser to navigate to the relevant webpage as the target page. In other cases, the web link initiates an action that causes a selectable option for the webpage redirect command to be presented to the user that, when selected, causes the web browser to navigate to the relevant webpage as the target page.

In the case of a video, the graphic object may move locations as the video progresses. By progressively using the image recognition, the locations of the graphic object and its graphic object boundary are continuously identified. In such cases, the web link may progressively be embedded within the location of the graphic object boundary as they change. As such, the user can interact with the web link by interacting, such as a selection input, with the graphic object as it moves across the screen.

In cases, this is all done without changing the visual image of the video. Thus, for a user watching a movie, the movie may not appear interrupted. However, the user can interact with the graphic object within the movie as it is playing, should the user want to navigate to a webpage related to the graphic object.

It will be realized the method just described is only an example that can be practiced from the description that follows, and it is provided to more easily understand the technology and recognize its benefits. Additional examples are now described with reference to the figures.

Turning now to FIG. 1, FIG. 1 illustrates example operating environment 100 in which implementations of the present disclosure may be employed. In particular, FIG. 1 illustrates a high-level architecture having components in accordance with implementations of the present disclosure. The components and architecture of FIG. 1 are intended as examples.

Among other components or engines not shown, operating environment 100 includes computing device 102. Computing device 102 is shown communicating using network 104 to data store 106 and web browser extension 108.

Network 104 may include one or more networks (e.g., public network or virtual private network "VPN") as shown with network 104. Network 104 may include, without limitation, one or more local area networks (LANs) wide area networks (WANs), or any other communication network or method.

In general, computing device 102 may be a device that corresponds to the computing device 800 described with reference to FIG. 8. In implementations, computing device 102 may be a client-side or front-end device, while in other implementations computing device 102 represents a back-end or server-side device. As will be discussed, computing device 102 may also represent one more computing devices, and as such, some variations of the technology comprise both a client-side or front-end device, and a back-end or server-side computing device performing functions that will be further described.

Operating environment 100 comprises data store 106. Data store 106 generally stores information including data, computer instructions (e.g., software program instructions, routines, or services), or models used in embodiments of the described technologies. Although depicted as a single database component, data store 106 may be embodied as one or more data stores or may be in the cloud.

Web browser extension 108 is also illustrated as part of operating environment 100. In the example shown, web browser extension 108 comprises linking engine 110. As shown, linking engine 110 comprises graphic object identifier 112, webpage identifier 114, and web link embedder 116. Web browser extension 108 is further illustrated comprising webpage navigator 118.

Having identified various components of operating environment 100, it is noted again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously listed components. Other arrangements and elements (e.g., machines, interfaces, functions, orders, and groupings of functions, etc.) can be used in addition to or instead of those shown, and some elements may be omitted altogether.

Further, many of the elements described in relation to FIG. 1, such as those described in relation to web browser extension 108, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 1 may be performed by computing device 102 at either the front-end, client-side or the back-end server side, in any combination of functions.

Having this in mind, web browser extension 108 generally identifies graphic images and embeds a related web link within the graphic images using linking engine 110. Web browser extension 108 also generally facilitates navigation of a network, such as the Internet. Web browser extension 108 can be configured to monitor graphic objects by identifying images or video being provided by a web browser at a graphical user interface and employing linking engine 110 to identify graphic objects in the images or video and embed web links.

It is intended that web browser extension 108 be broadly interpreted to include any software component that performs the functionality described in relation to web browser extension 108. That is, web browser extension 108 comprises the traditional notions of a software extension that provides additional features to an already working or stand-alone application. However, in the context of this application, it is also meant to comprise functionality that is originally included as part a software package or standalone application, or included as updates, add-ons, or the like. As an illustration, web browser extension 108 is intended to include extensions, add-ons, or updates to traditional web browsers; to include features that are originally or continually included as part of a web browser; to include third-party (e.g., a software program that is not part of the web browser) that runs simultaneously to a web browser; and the like.

As noted, web browser extension 108 can employ linking engine 110 to identify graphic objects and embed web links related to the graphic objects. In general, the relationship between web browser extension 108 and linking engine 110 is not meant to imply that all aspects of the technology will included an individual subcomponent, such as linking engine 110. For clarity in understanding and describing the technology within this disclosure, some functions that relate to the graphic object identification and web link embedding are separately described from features that may be performed by other aspects of the web browser. In practice, however, the functions may take on any arrangement.

The example linking engine 110 of FIG. 1 employs graphic object identifier 112, webpage identifier 114, and web link embedder 116 to identify graphic objects and embed related web links.

In general, graphic object identifier 112 performs image recognition to identify graphic objects or graphic object boundaries. These may be graphic objects provided at a web browser within an image or video. Graphic objects comprise visual objects within an image or video. Within an image, there are typically one or more graphic objects. For example, suppose an image of the inside of a coffee shop is being provided by the web browser. Graphic objects within the image might include a coffee cup, a chair, the barista, and so forth.

To identify graphic objects, graphic object identifier 112 can employ a trained machine learning model. The trained machine learning model can be retrieved from machine learning models 120 stored at data store 106.

Machine learning models 120 suitable for use by the present technology include deep learning models. These models can be trained using pre-labeled images, including images of objects that have been previously identified. One example that works well with the present technology includes a convolutional neural network (CNN). These models can be trained for object identification or object classification. One subset of CNNs that can be employed includes region-based CNNs (R-CNNs). Some specific R-CNNs can also identify not just an object, but also the region or area occupied by an object in an image. In one example, a mask R-CNN can be trained and employed to identify object and object regions. Additional deep learning techniques use a CNN as both an encoder and decoder, which allows for a region-based out, such as a segmentation mask of an object in an image. Another deep learning technique suitable for use as part of machine learning models 120 includes a trained YOLO algorithm (You Only Look Once). It will be understood, and it is contemplated by the inventors that other machine learning algorithms and techniques may be available and may become available that are suitable for use. It is intended that these be included within the scope of this disclosure.

Graphic objects can be identified from images, including video, that are being displayed by the web browser. Graphic object identifier 112 monitors that information being provided by the web browser. When the information is in the form of an image, graphic object identifier 112 can use the image as input into the trained machine learning model that is configured to output the identity of graphic objects within the image based on the training. As noted, some trained machine learning models output the identity of the graphic object, meaning that the model identifies the graphic object as being distinct from other part of the image, including other graphic objects. In some implementations, the trained machine learned model identifies the graphic object as distinct and also makes a prediction as to the identity of the graphic object. Put another way, graphic object identifier 112 may identify a graphic object by determining that an area of the image associated with the graphic object is distinct from other areas of the image or may predict the actual identity of the graphic object, e.g., this area of the image is distinct from other areas and is likely a fox.

The graphic object boundaries of the graphic object can be identified using a machine learning algorithm that outputs a segmentation mask, key points, or the like. Algorithms outputting segmentation masks can be beneficial in that these may determine which pixels of the image are part of the graphic object. Terminal edge pixels comprise the graphic object boundary in this instance. Graphic object boundaries can be identified as corresponding to terminal edge pixels, and the area within the graphic object boundaries, where each pixel is associated with the graphic object, is identified as the graphic object. In some cases, the trained machine learned model being used outputs bounding boxes for a graphic object. In such cases, the graphic object boundaries may correspond to the bounding boxes. Thus, graphic object identifier 112 identifies one or more graphic objects in an image.

Similarly, graphic object identifier 112 can use images from a video being provided at the web browser to identify graphic object and graphic object boundaries of the graphic objects. When a video is being played at the web browser, graphic object identifier 112 may use frames from the video and input the frames into the machine learning model as the image. The output is thus the graphic objects and the graphic object boundaries for that frame. In some cases, graphic object identifier 112 captures snap shots from a video. That is, graphic object identifier 112 intermittently takes still images from a video while the video is playing and uses these still images as the input images for the model. This can be beneficial in some cases where computational speeds are relatively lower, as the number of input images can be reduced by defining the number of intermittent still images that serve as inputs.

Graphic object identifier 112 can progressively identify graphic objects within an image provided by a web browser. As such, when a user is navigating an online network, the web browser may display different images. As the different images are displayed, graphic object identifier 112 identifies graphic objects within the different images by using the different images as inputs to the machine learning model. As such, a first image can be displayed by the web browser and graphic object identifier 112 identifies the graphic objects in the first image. The first image may be removed from display and a second image displayed as the user navigates that network. Graphic object identifier 112 then identifies the graphic objects in the second image. This can automatically be performed in the background.

Similarly, with video, graphic object identifier 112 identifies graphic objects from a first image of the video and then identifies graphic objects in the second image of the video. As the video progress, the graphic object identifier 112 progressively identifies the graphic objects and the graphic object boundaries as these change from image to image, e.g., as they appear to move across the screen.

Figure 2:
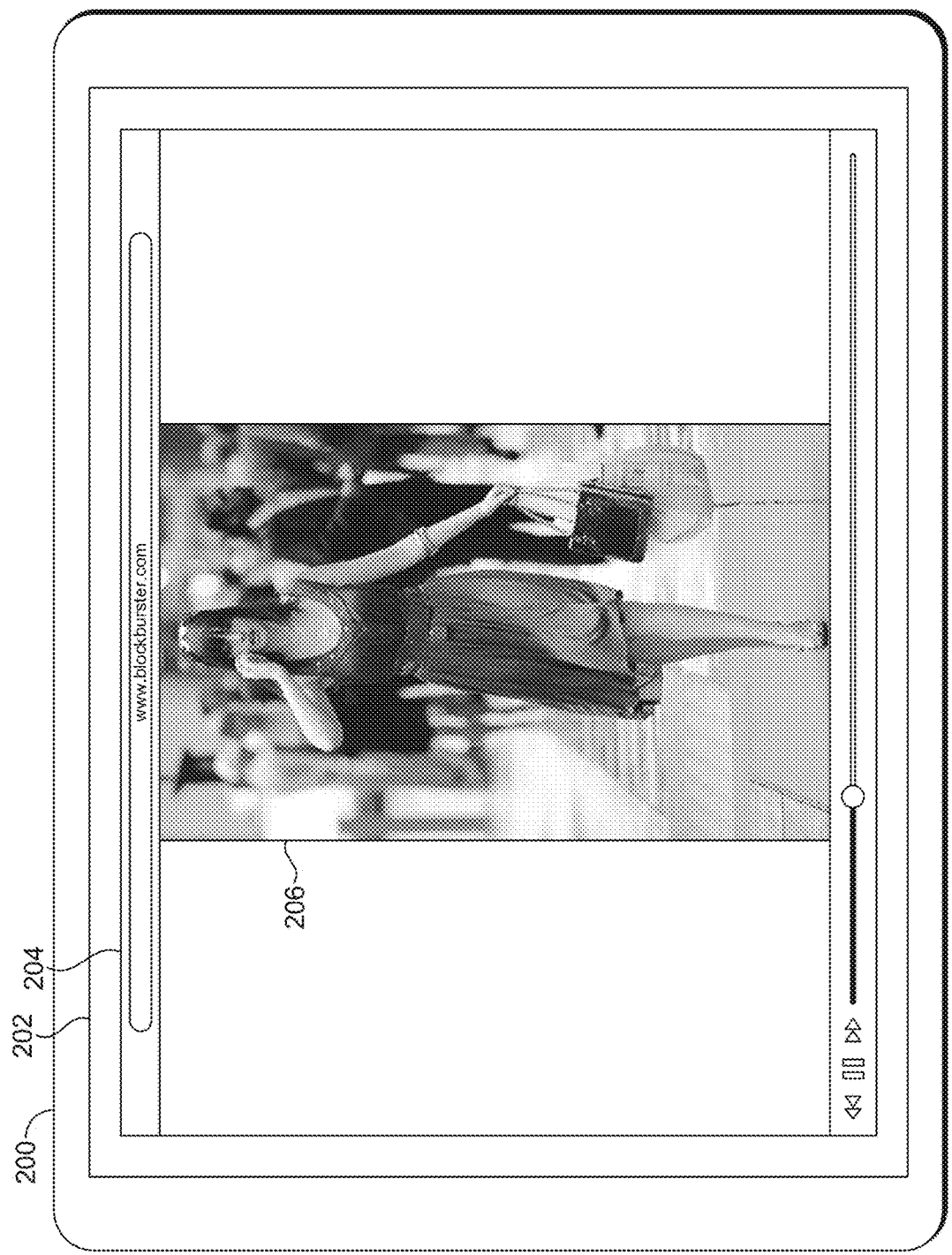
FIG. 2 is a computing device having a display that is displaying a web browser providing an image comprising graphic objects, in accordance with an aspect described herein.

To illustrate, FIG. 2 is provided and shows computing device 200 having display 202. Display 202 is displaying web browser 204 that is providing image 206 at a graphical user interface. It will be understood that image 206 may be a still image that is provided at a webpage or may be a still image taken from a video that is being provided by web browser 204.

Graphic object identifier 112 may identify the graphic object that are within image 206. As noted, graphic object identifier 112 may do this by inputting image 206 into a machine learning model configured to output the graphic object and graphic object boundaries of image 206.

Figure 3:
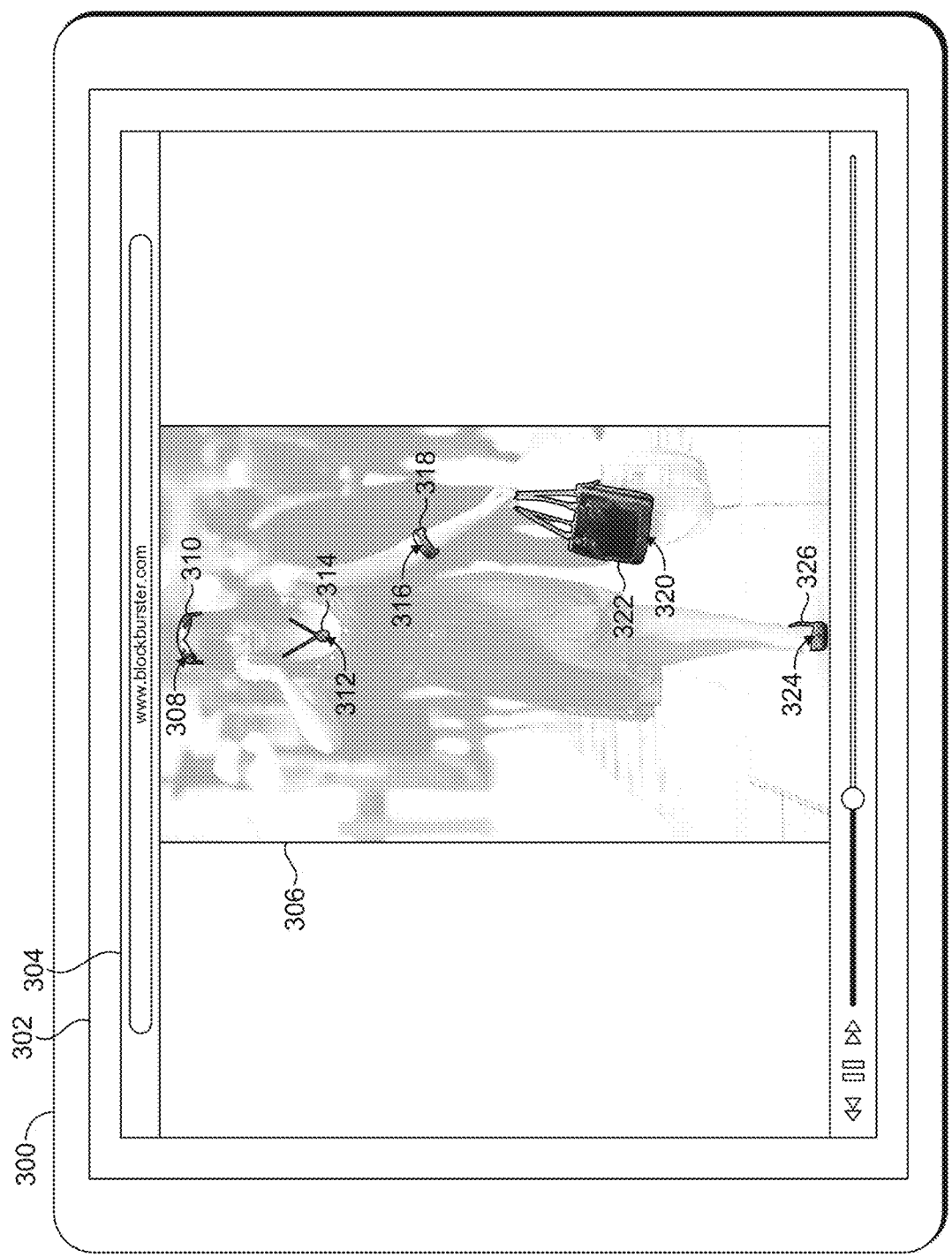
FIG. 3 is a computing device having a display that is displaying a web browser having an example output of graphic object and graphic object boundary identifications, in accordance with an aspect described herein.

FIG. 3 is provided to illustrate an example output of graphic objects and graphic object boundaries provided by graphic object identifier 112. FIG. 3 comprises computing device 300 having display 302 that is displaying web browser 304 at a graphic user interface. Web browser 304 is providing image 306. Image 306 is intended to correspond to image 206 of FIG. 2. However, as illustrated in FIG. 3, graphic object identifier 112 has identified the graphic object and graphic object boundaries within the image.

It will be understood that FIG. 3 is provided as an example to illustrate how the technology could be employed. Only a selection of the graphic objects that are within image 206 have been illustrated as identified in image 306 for brevity in describing the technology and to more clearly illustrate the identification of the graphic objects within the images. As, image 306 of FIG. 3 is provided to illustrate the output of the identification, it will be understood that in some aspects of the technology, a user may not see the identification of the graphic objects as shown in the figure. Instead, the technology can be implemented such that the original image is presented, such as image 206 in FIG. 2, while identification of the graphic objects is latent in the original image. That is, what appears to be the original image from the image or video has metadata associated with an area, such as metadata corresponding to pixels, associated with the graphic objects identifying the area as that of the graphic object. This metadata can also include an indication of the graphic object boundaries. As the metadata is latent in the image, the image appears original to the user, even though graphic object identifier 112 has identified the graphic objects and the graphic object boundaries, and has associated areas of the image with the graphic objects.

As shown in the example provided by FIG. 3, graphic object identifier 112 has identified first graphic object 308 and first graphic object boundary 310. In in this instance, first graphic object 308 and first graphic object boundary 310 are associated with an area corresponding to a pair of sunglasses. Graphic object identifier 112 has also identified second graphic object 312 and second graphic object boundary 314, which include an area corresponding to a necklace in this case. Similarly, graphic object identifier 112 has identified third graphic object 316 and third graphic object boundary 318, which include an area corresponding to a bracelet. Continuing, graphic object identifier 112 has identified fourth graphic object 320 and third graphic object boundary 322, which include an area corresponding to a handbag. The last graphic object identified for this illustrative example is graphic object 324, along with graphic object boundary 326, which correspond to an area providing a pair of shoes.

If image 306 is included as part of a video being provided by web browser 304, graphic object identifier 112 of FIG. 2 may progressively identify graphic objects and graphic object boundaries as the video progresses. The term "progressively" is meant to comprise continuously performing image recognition on each frame of the video or performing image recognition intermittently using a defined number of still images taken from the video during a defined timeframe. One example of this would be using three still images per second. In this way, as the video is being played, graphic object identifier 112 is performing image recognition during the video to progressively identify the graphic objects and the graphic object boundaries as the graphic objects are moving locations within the graphical user interface of the display.

Webpage identifier 114 generally identifies webpages related to graphic objects identified by graphic object identifier 112. Webpage identifier 114 may perform a web search using the output of graphic object identifier to identify related webpages. In some instances, webpage identifier 114 broadly performs a web search using a search engine that crawls a plurality of different websites and ranks webpages from the plurality of different websites. In other cases, webpage identifier 114 performs a search on a specific website to identify webpages associated with the specific website. For example, webpage identifier 114 may use the output of graphic object identifier 112 to search an ecommerce platform to identify item listings for items related to the output of graphic object identifier 112.

As noted, an output of graphic object identifier 112 may comprise identifying an area related to a graphic object and its graphic object boundaries. Webpage identifier 114 can use this output to perform a reverse image search using a search engine. The reverse image search is based on the graphic object boundaries. For instance, webpage identifier 112 can use the area, which may be in the form of labeled pixels, associated with the graphic object as the input for the reverse image search, as the area of the image associated with the graphic object extends to the graphic object boundaries, which as noted, can include the terminal edge pixels or a terminal edge of the area. Webpage identifier 112 may extract the area identified as associated with the graphic object up to the graphic object boundaries and input this area into the search engine to perform the reverse image search. The output of the reverse search includes webpage addresses that are related to the graphic object, such as webpage addresses to a webpage having an image of the graphic object or an image similar to the graphic object. If more than one webpage address is output by the reverse search engine, the webpage identifier 114 may select a highest-ranked webpage address based on a ranking provided by the reverse search engine.

Where the output of graphic object identifier 112 predicts an identify of a graphic object having an identified area in the image distinct from other areas of the image, graphic object identifier 112 can perform a search using the graphic object identify. For instance, if the output predicts that a graphic object in the image includes a fox, then the graphic object identifier 112 could use "fox" as input to the search engine. The identity of the graphic object may be input into the search engine in lieu of the graphic object itself as extracted from the image, or a combination of both may be used as inputs. The output by the search engine is similar, in that it provides a ranking of related webpage addresses from which graphic object identifier 112 can select based on the ranking, e.g., selecting the highest-ranked webpage address of the ranked related webpage addresses output by the search engine.

Figure 4:
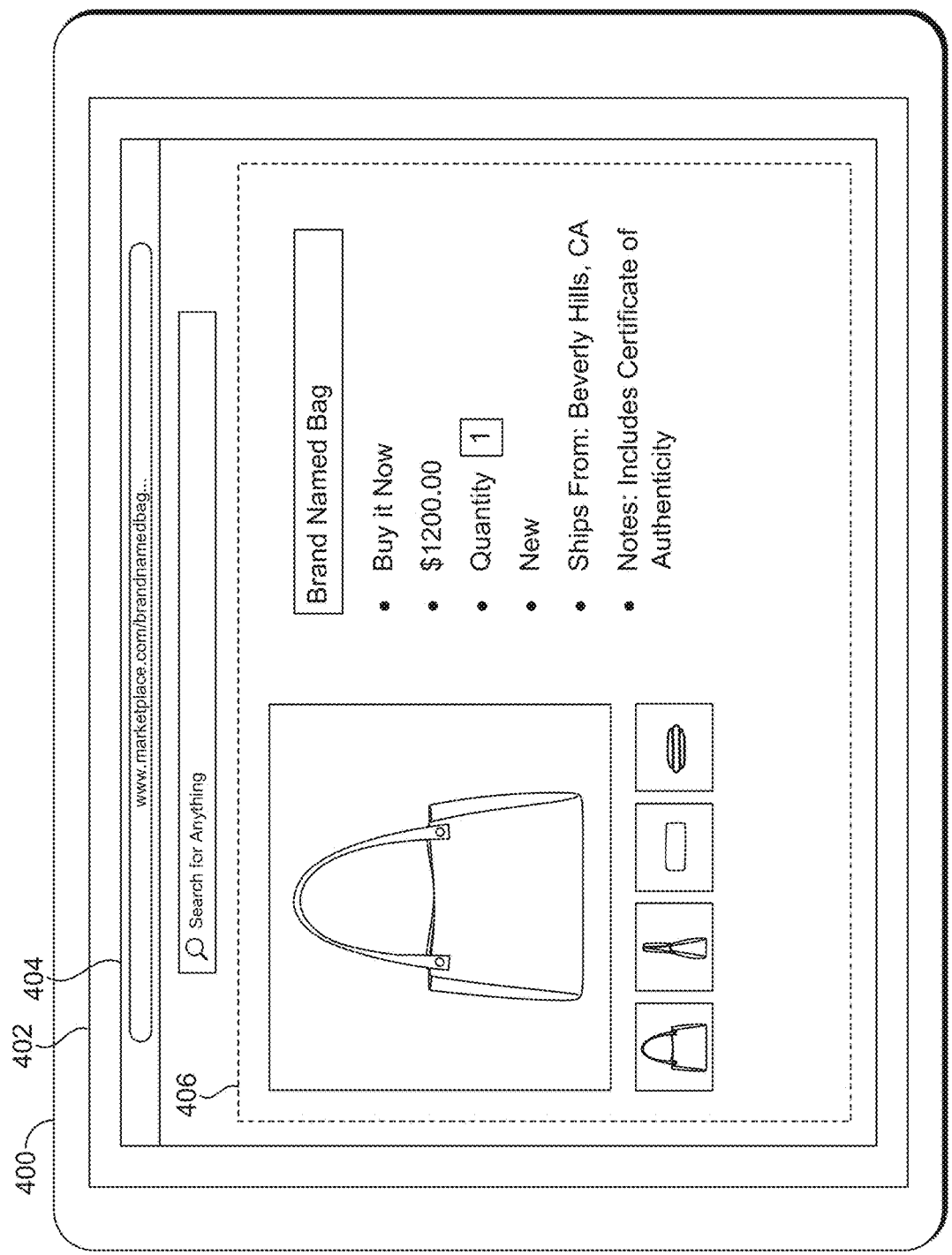
FIG. 4 is a computing device having a display that is displaying a web browser providing an item listing at a webpage related to an identified graphic object, in accordance with an aspect described herein.

To illustrate with an example, FIG. 4 is provided. FIG. 4 illustrates computing device 400 having display 402 with a graphic user interface that is displaying web browser 404. Web browser 404 is providing item listing 406. Item listing 406 is provided as an example of a webpage that is relevant to fourth graphic object 320 of FIG. 3. In this example, webpage identifier 114 has used an input of the identity of the fourth graphic object 322, e.g., "brand named bag," or the area of image 306 corresponding to fourth graphic object 322, or both, as input into a search engine. In response, the search engine output comprises a web address related to the webpage of item listing 406. In a particular case, the webpage associated with fourth graphic object 322 is identified by instructing the search engine to search for pages of a specific website, which is in this example is "www.marketplace.com," as illustrated in FIG. 4. The output is the identity of a webpage hosted by the specific website and related to the fourth graphic object 322, which has a web address of www.marketplace.com/brandnamedbag . . . , as also illustrated in FIG. 4.

With reference again to FIG. 1, web link embedder 116 generally embeds a web link that facilitates navigation to the webpage identified by webpage identifier 114. In general, for an identified graphic object, web link embedder 116 embeds a web link with which a user can interact. When the user interacts with the web link, the web link has an associated action that is taken, for instance, by web browser extension 108 based on the interaction. The interaction may also be called a selection input. While in most cases, the selection input comprises a click action or a touch action at a touch-screen, it will be understood that any input component of computing device 102 can be used to provide the selection input that is received by computing device 102 or received by another component of FIG. 1 based on a communication of the selection input from computing device 102.

By facilitating navigation to the related webpage identified by webpage identifier 114, web link embedder 114 can embed a web link that comprises actions of immediately instructing the web browser, through a webpage redirect command, to act as a hyperlink and navigate to the web address of the related webpage; instruct the web browser to delay navigation to web address of the related webpage by delaying the webpage redirect command until a stop point of a video (such as a pause or end of the video); instruct the web browser or another program to provide a selectable option for a webpage redirect command for the web address of the related webpage, which can also include providing the selectable option at the stop point of the video; or take another like action.

Web link embedder 114 can embed a web link within the image or video. In some cases, the web link is embedded within the graphic object boundary of the graphic object in the image. This may include within a bounding box or within terminal edges of the graphic object. For instance, the web link is embedded over an area within and extending to the terminal edges of the graphic object. As such, a user viewing an image or watching a video at the web browser can provide a selection input at a location corresponding to the graphic object in the image or video to interact with the graphic object or the embedded web link. Where the web browser is providing a video, then web link embedder 114 can progressively imbed the web link for the associated graphic object as the video is playing. Like graphic object identifier 112, web link embedder 114 can progressively embed the web link for each frame of the video or embed the web link a determined number of times over a timeframe. Thus, as a graphic object moves locations across the graphical user interface while the video is playing, web link embedder 114 progressively embeds the web link within the locations of the area corresponding to the graphic object in the image. In this way, the user watching the video can interact with a graphic object during different times of the video and at any location of the graphic object on the screen, even as the graphic object moves across the screen.

In one specific case, web link embedder 114 embeds a webpage redirect command within an image of the identified graphic object. This may be done upon receiving the selection input at the embedded web link in the image or video. The image of the graphic object can be presented at a stop point of the video as a selectable option, as will be illustrated in more detail in FIG. 5. Thus, when a user provides a selection input to the image at the stop point of the video, the webpage redirect command is provided to the web browser to navigate the web browser to the related webpage. Web link embedder 114 may also use the area of the image corresponding to the identified graphic object to provide as the image of the graphic object at the stop point of the video as the selectable option.

Figure 5:
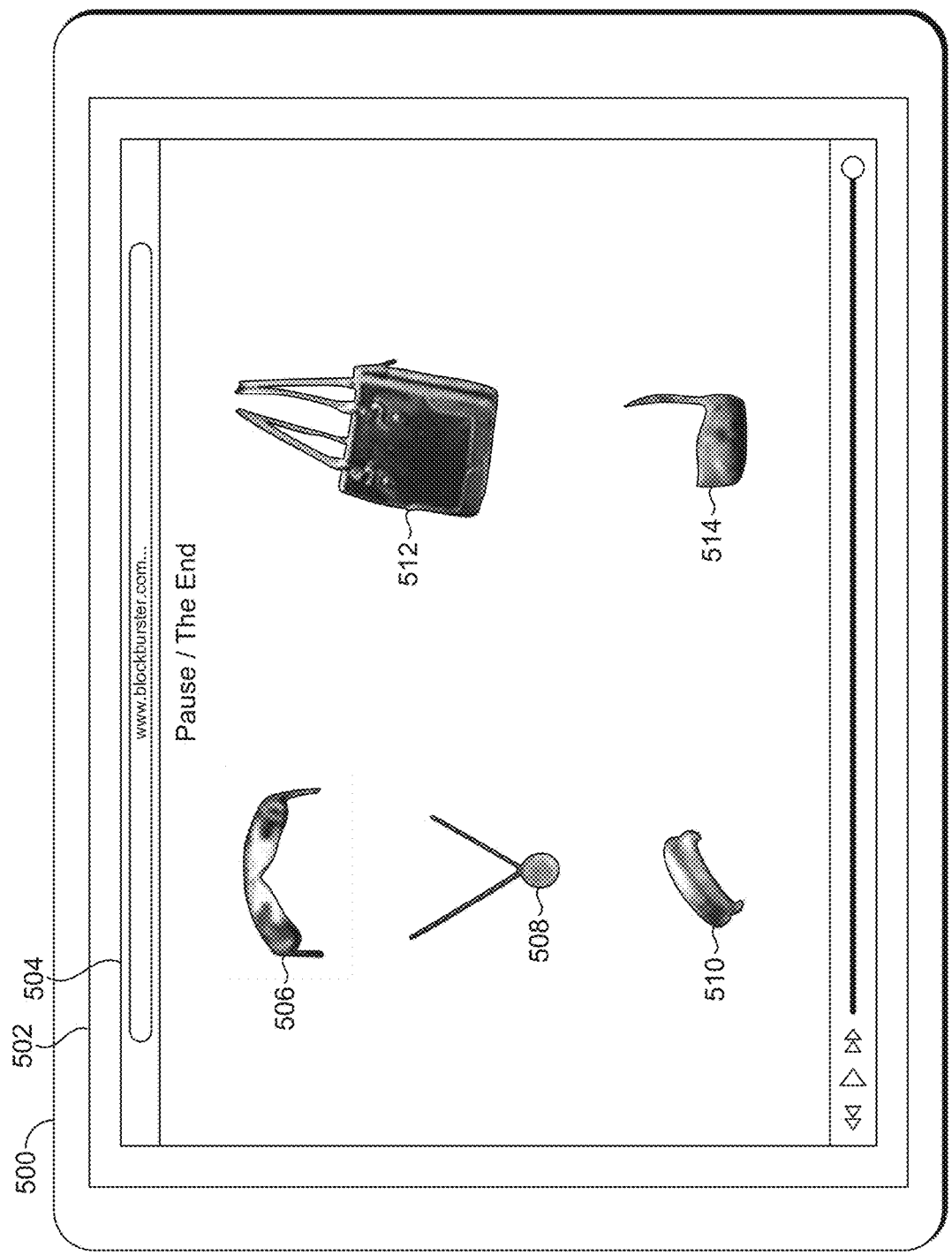
FIG. 5 is a computing device having a display that is displaying a web browser providing images of identified graphic objects at a stop point of a video, in accordance with an aspect described herein.

To illustrate, FIG. 5 is provided to show an example of images of graphic objects that have been provided at a stop point of video. FIG. 5 comprises computing device 500 having display 502 that is displaying web browser 504. Here, web link embedder 114 has embedded selectable options that provide a webpage redirected command to a web browser to navigate to a webpage identified by webpage identifier 114 as related to the associated graphic objects. As illustrated, the selectable options are embedded in images of the graphic objects, where the images of the graphic objects are determined from the image or video with which the user interacts based on the graphic object boundaries. In this example, first image 506 corresponds to first graphic object 308 of FIG. 3; second image 508 corresponds to second graphic object 312; third image 510 corresponds to third graphic object 316; fourth image 512 corresponds to fourth graphic object 320; and fifth image 514 corresponds to fifth graphic object 324. In instance, the image of the graphic object offered at the stop point of the video is determined from a video at a time that the user interact with the video by providing a selection input within an area corresponding to the graphic object in the video.

Continuing with the example, a user might interact with fourth graphic object 320 by providing a selection input within fourth graphic object boundary 322 of FIG. 3. Based on this selection input, web link embedder 116 has determined an image of the graphic object based on the fourth graphic object 320 in the video and has embedded a web page redirect command within the determined image of the graphic object provided at the stop point of the video, illustrated in FIG. 5 as fourth image 512. This is just one example of the several graphic objects illustrated in FIG. 5, and it will be understood that web link embedder 116 can perform a similar process to embed web page redirect commands to other images of graphic objects. In this way, a user may interact with image 512 by using a selection input to initiate the webpage redirect command that instructs the browser to navigate to a webpage related to fourth graphic object 320, as illustrated in the example webpage of FIG. 4.

Webpage navigator 118 generally navigates a user to a webpage, such as the webpage illustrated in FIG. 4. Webpage navigator 118 can receive a webpage redirect command based on a selection input from the user at a graphic object in an image or video or at a selectable option provided at a stop point of the video.

Upon receiving the webpage redirect command, webpage navigator 118 provides the web browser with the webpage address associated with the webpage redirect command to the related webpage and instructs the web browser to navigate to the webpage. In response, the web browser may navigate to the related webpage and display the related webpage at a graphical user interface of a computing device.

Figure 6:
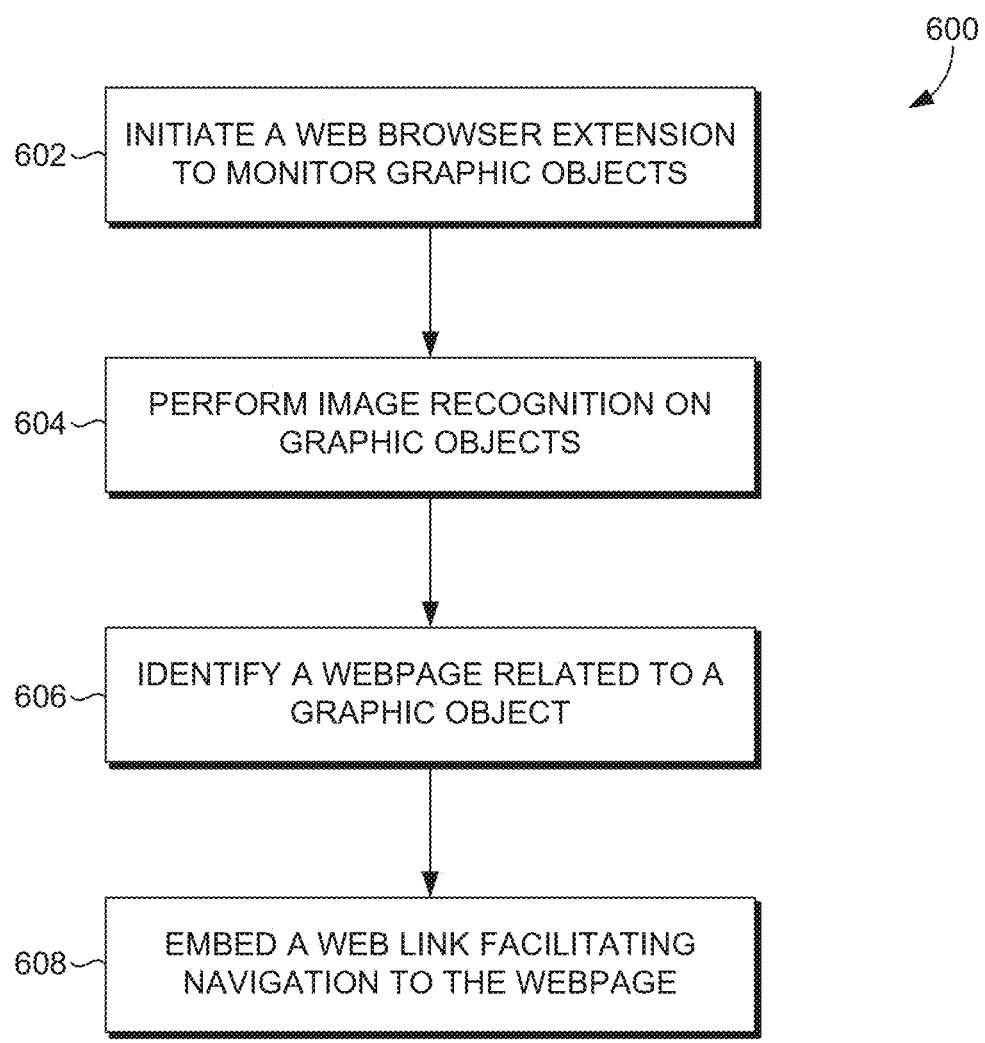
FIGS. 6-7 are block diagrams of example methods for providing web links, in accordance with embodiments described herein.
Figure 7:
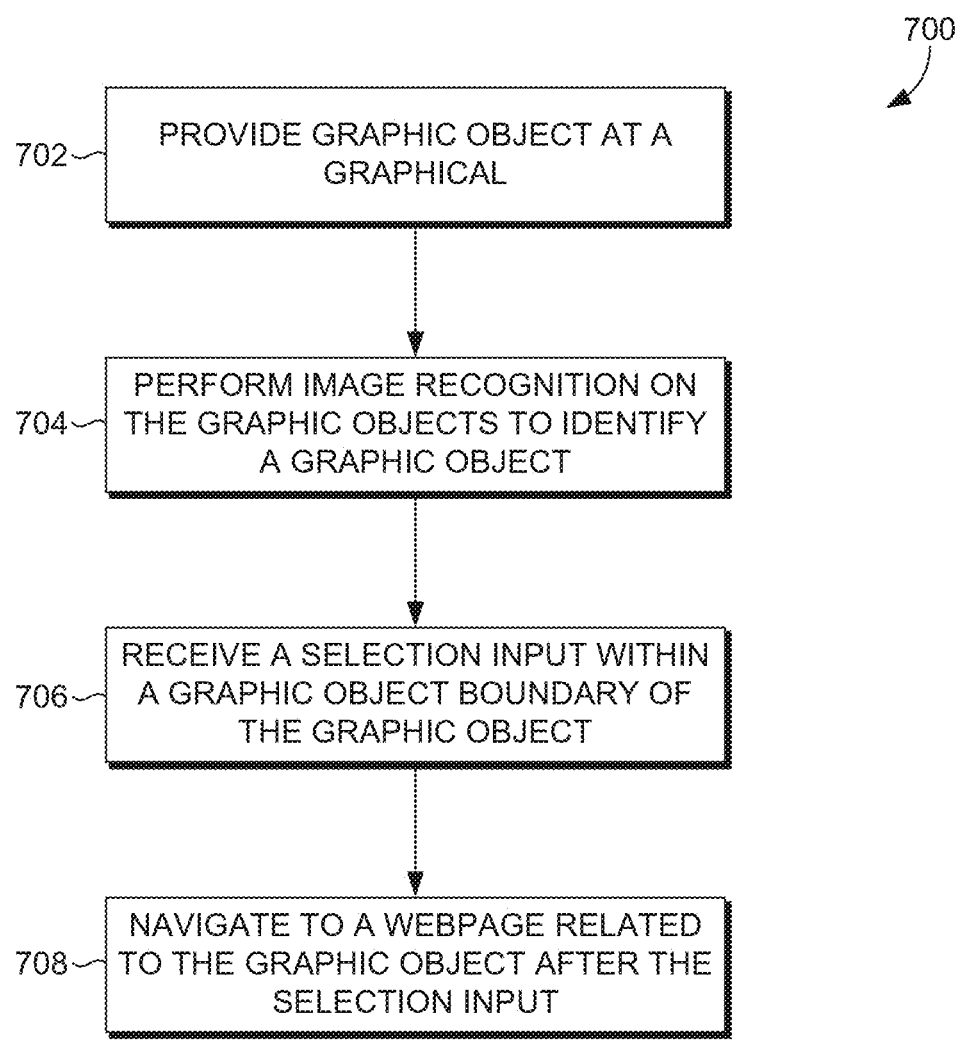

With reference now to FIGS. 6-7, block diagrams are provided to illustrate methods for providing web links. The methods may be performed using the system described herein. In embodiments, one or more computer storage media having computer-executable instructions embodied thereon that, when executed, by one or more processors, cause the one or more processors to perform operations of the methods for providing web links.

FIG. 6 is a block diagram of example method 600 for providing web links. At block 602, a web browser extension is initiated to monitor graphic objects. The web browser may monitor graphic objects by identifying images or video provided by a web browser at a graphical user interface. A web browser extension can be initiated by executing the web browser extension to identify images or video provided by the web browser. Graphic objects being monitored may be included as part of the video or images being provided.

At block 604, image recognition is performed on graphic objects. That is, image recognition can be performed by inputting the images or the video that includes the graphic objects so that the output of the image recognition is the identity of the graphic objects within the image or video. The image recognition can be performed by a trained machine learning model that outputs an identity of a graphic object or an area within the input image corresponding to the graphic object that is distinct from the remaining area of the image. The output of the trained machine learned model may also include graphic object boundaries. In cases where video is being provided at the web browser, the image recognition may be performed progressively to identify the graphic object locations as it moves during progression of the video.

At block 606, a webpage related to an identified graphic object may be identified. As discussed, the webpage may be identified from using a search engine and inputting the identity of the graphic object determined from the image recognition. The search engine may be employed to perform a reverse image search based on the graphic object boundaries. That is, the area of the image corresponding to the graphic object extending the graphic object boundaries can serve as the input for the reverse image search. The output of the search engine provides one or more web addresses associated with one or more webpages related to the object of the search, i.e., the graphic object.

At block 608, a web link is embedded to facilitate navigation to the webpage. The web link can be embedded into an area of the image corresponding to the graphic object. In some cases, this includes embedding the web link within the graphic object boundaries and over an area extending to terminal edges of the graphic object. The web link may act as a hyperlink and initiate a webpage redirect command to immediately instruct the web browser to navigate to the related webpage. The web link may initiate an action that delays navigation. The web link may initiate a webpage redirect command to be presented at a stop point of the a video, which in some instances, includes embedding the webpage redirect command into an image of the graphic object presented at a stop point of a video. In cases where the web browser is providing a video, the web link may be embedded progressively within the graphic object boundaries of the graphic object as the graphic object moves locations across the screen.

With reference now to FIG. 7, a block diagram of example method 700 for providing web links is provided. At block 702, graphic objects are provide at a graphical user interface of a computing device. The graphic object may be included within an image or a video provided by the computing device at the graphical user interface.

At block 704, image recognition is performed on the graphic objects being provided at the graphical user interface. The image recognition can be performed on the image or video comprising the graphic objects. The image recognition can be performed using a machine learned model similar to that discussed with respect to FIG. 6. The output of the image recognition may be an identity of the graphic object or may be an area corresponding to the graphic object in the image. The output may include graphic object boundaries of the graphic object. When performing image recognition on video, the image recognition can be performed progressively on images from the video, e.g., on the location of the graphic objects as the graphic objects move during progression of the video.

At block 706, a selection input is received. The selection input may be received by any input component of the computing device or received as a communication in response to an input at an input component. In some case, the selection input is received within the graphic object boundary of an identified graphic object that comprises an embedded web link.

At block 708, the web browser provided that graphical user interface of the computing device navigates to a webpage related to the graphic object after the selection input. For instance, the web browser may be instructed to navigate immediately to the webpage in response to the selection input within the graphic object boundary. In some cases, the navigation follows selection of a webpage redirect command that is provided in response to the selection input within the graphic object boundary.

Having described an overview of embodiments of the present technology, an example operating environment in which embodiments of the present technology may be implemented is described below in order to provide a general context for various aspects of the present technology. Referring initially to FIG. 8, in particular, an example operating environment for implementing embodiments of the present technology is shown and designated generally as computing device 800. Computing device 800 is but one example of a suitable computing environment and is not intended to suggest any limitation as to the scope of use or functionality of the technology. Neither should computing device 800 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Figure 8:
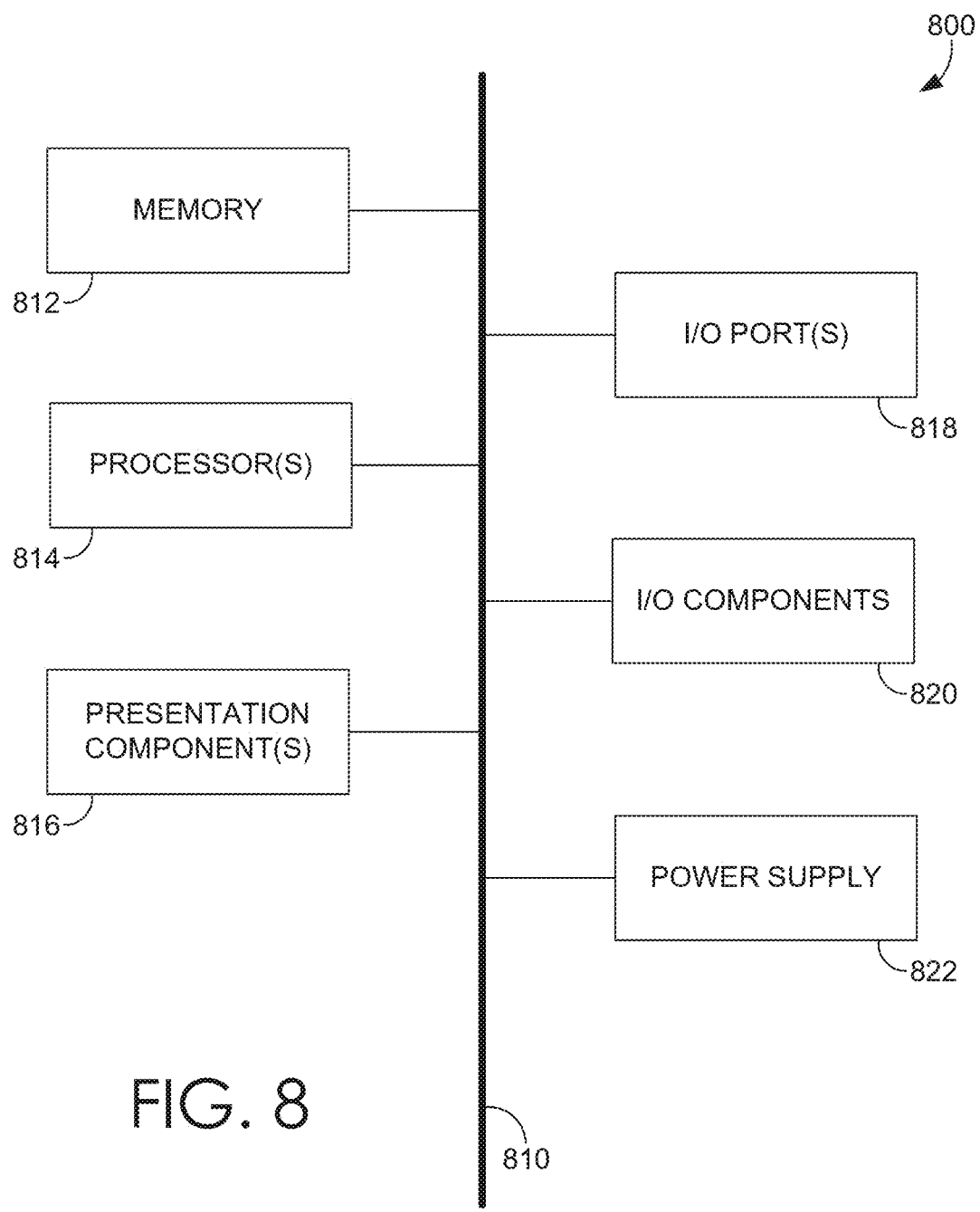
FIG. 8 is an example computing device suitable for implementing the described technology, in accordance with an embodiment described herein.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 merely illustrates an example computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanisms and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Examples of presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the words "including" and "having," among other similar terms, have the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. Also, the word "initiating" has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the web browser extension and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computer-implemented method for providing web links, the method comprising:
    initiating a web browser extension configured to monitor graphic objects within a video that is provided by a web browser at a graphical user interface;
    performing image recognition on the graphic objects being monitored by the web browser extension to identify a graphic object and a graphic object boundary of the graphic object on the graphical user interface;
    identifying a webpage related to the graphic object identified from the image recognition;
    embedding a web link that facilitates navigation to the webpage within the graphic object boundary of the graphical user interface;
    receiving a selection input within the graphic object boundary while the video is being presented at a computing device; and
    at an end of the video, providing a selectable option for a webpage redirect command associated with the web link, wherein selection of the webpage redirect command causes navigation to the webpage related to the graphic object.

2. The method of claim 1, wherein the graphic object boundary comprises terminal edges of the graphic object on the graphical user interface and the web link is embedded over an area within and extending to the terminal edges of the graphic object.

3. The method of claim 1, wherein the graphic object identified from the image recognition moves locations within the graphical user interface during progression of the video, and wherein the web link is progressively embedded within the locations of the graphic object boundary during the progression of the video.

4. The method of claim 1, wherein the webpage redirect command is embedded in an image of the graphic object, the image of the graphic object having the embedded redirect command being provided at the graphical user interface at the end of the video.

5. The method of claim 4, wherein the image of the graphic object provided at the end of the video is determined from the video at a time the selection input is received within the graphic object boundary.

6. One or more computer storage media having computer-executable instructions stored thereon that when executed by a processor, cause the processor to perform operations for providing web links, the operations comprising:
    performing image recognition on graphic objects that are part of a video, the image recognition being performed while the video is being provided at a graphical user interface of a computing device, wherein the graphic object and a graphic object boundary of the graphic object are identified from the image recognition;
    identifying a webpage related to the graphic object identified from the object recognition;
    embedding a web link that facilitates navigation to the webpage related to the graphic object within the graphic object boundary of the graphical user interface;
    receiving a selection input within the graphic object boundary while the video is being presented at a computing device; and
    at an end of the video, providing a selectable option for a webpage redirect command associated with the web link, wherein selection of the webpage redirect command causes navigation to the webpage related to the graphic object.

7. The media of claim 6, wherein the graphic object boundary comprises terminal edges of the graphic object on the graphical user interface and the web link is embedded over an area within and extending to the terminal edges of the graphic object.

8. The media of claim 6, wherein the graphic object identified from the image recognition moves locations within the graphical user interface during progression of the video, and wherein the web link is progressively embedded within the locations of the graphic object boundary during the progression of the video.

9. The media of claim 6, wherein the selection input within the graphic object boundary initiates a command to generate a webpage redirect command, the webpage redirect command instructing a web browser to navigate to the webpage related to the graphic object.

10. The media of claim 9, wherein the webpage redirect command is embedded in an image of the graphic object, the image of the graphic object having the embedded redirect command being provided at the graphical user interface at the end of the video.

11. The media of claim 10, wherein the image of the graphic object is retrieved from a portion of the video comprising the graphic object based on the graphic object boundary identified from the object recognition.

12. The media of claim 6, further comprising performing a reverse image search using the graphic object based on the graphic object boundary identified from the image recognition to identify the webpage related to the graphic object.

13. The media of claim 10, wherein the image of the graphic object provided at the end of the video is determined from the video at a time the selection input is received within the graphic object boundary.

14. A system for providing web links comprising:
at least one processor; and
one or more computer storage media having computer-executable instructions stored thereon that when executed by a processor, cause the processor to perform operations comprising:
providing a video comprising graphic objects via a web browser at a graphical user interface of a computing device;
performing image recognition on the graphic objects being provided via the web browser to identify a graphic object and a graphic object boundary of the graphic object on the graphical user interface;
receiving a selection input at the computing device within the graphic object boundary of the graphic object, wherein a web link is embedded within the graphic object boundary, the web link facilitating navigation to a webpage related to the graphic object identified from the image recognition;
at an end of the video, providing a selectable option for a webpage redirect command associated with the web link; and
navigating to the webpage related to the graphic object after selection of the webpage redirect command.

15. The system of claim 14, wherein the graphic object boundary comprises terminal edges of the graphic object on the graphical user interface, the web link being embedded over an area within and extended to the terminal edges of the graphic object, wherein the selection input is received within the terminal edges of the graphic object.

16. The system of claim 14, wherein the graphic object identified from the image recognition moves locations within the graphical user interface during progression of the video, and wherein the web link is progressively embedded within the locations of the graphic object boundary during the progression of the video.

17. The system of claim 14, further comprising providing an image of the graphic object at the end of the video, the webpage redirect command being embedded within the image.

18. The system of claim 14, further comprising performing a reverse image search using the graphic object based on the graphic object boundary identified from the image recognition to identify the webpage related to the graphic object.

19. The system of claim 17, wherein the image of the graphic object provided at the end of the video is determined from the video at a time the selection input is received within the graphic object boundary.

\* \* \* \* \*